(12) United States Patent
Birken et al.

(10) Patent No.: US 9,377,528 B2
(45) Date of Patent: Jun. 28, 2016

(54) ROAMING MOBILE SENSOR PLATFORM FOR COLLECTING GEO-REFERENCED DATA AND CREATING THEMATIC MAPS

(75) Inventors: Ralf Birken, Somerville, MA (US); Ming-Liang Wang, Melrose, MA (US); Carey M. Rappaport, Wellesley, MA (US); Sara Wadia-Fascetti, Winchester, MA (US); J. Gregory McDaniel, Lexington, MA (US)

(73) Assignee: Northeastern University, Boston, MA (US)

( * ) Notice: Subject to any disclaimer, the term of this patent is extended or adjusted under 35 U.S.C. 154(b) by 236 days.

(21) Appl. No.: 13/636,112

(22) PCT Filed: Mar. 21, 2011

(86) PCT No.: PCT/US2011/029189
§ 371 (c)(1),
(2), (4) Date: Sep. 19, 2012

(87) PCT Pub. No.: WO2011/116375
PCT Pub. Date: Sep. 22, 2011

(65) Prior Publication Data
US 2013/0018575 A1    Jan. 17, 2013

Related U.S. Application Data

(60) Provisional application No. 61/315,571, filed on Mar. 19, 2010, provisional application No. 61/434,559, filed on Jan. 20, 2011.

(51) Int. Cl.
*G01S 13/00* (2006.01)
*G01S 13/88* (2006.01)
(Continued)

(52) U.S. Cl.
CPC .......... *G01S 13/885* (2013.01); *G01B 11/2513* (2013.01); *G01S 13/00* (2013.01); *G01S 15/89* (2013.01); *G01V 3/12* (2013.01); *G01S 13/89* (2013.01)

(58) Field of Classification Search
CPC .............................. G01S 13/89; G01S 13/885
USPC .............. 701/409; 342/22, 28; 702/5; 73/579
See application file for complete search history.

(56) References Cited

U.S. PATENT DOCUMENTS 5,384,715 A   1/1995  Lytton
6,568,444 B1 * 5/2003  Kaneko ................... 152/209.18
(Continued)

FOREIGN PATENT DOCUMENTS

JP      08261993 A  * 10/1996
WO   WO 0104659 A1 *  1/2001

OTHER PUBLICATIONS

GSSI, web page, 2001-2012, description of SIR-20 introduction date.*
(Continued)

*Primary Examiner* — Tuan C. To
*Assistant Examiner* — Isaac Smith
(74) *Attorney, Agent, or Firm* — Wilmer Cutler Pickering Hale and Dorr LLP

(57) ABSTRACT

A roaming sensor system collects data on the condition of roads and bridge decks and identifies and maps defects, including cracks, potholes, debonding, tracking, delamination, surface ice, surface water, and rebar corrosion. Data are collected by a vehicle or a fleet of vehicles driven at normal traffic speeds. The vehicle is outfitted with sensors that collect data using acoustic surface waves, ground penetrating radar, mm wave surface radar, and/or video images. The data are transmitted to a control center for analysis and distribution.

48 Claims, 14 Drawing Sheets

(51) Int. Cl.
*G01B 11/25* (2006.01)
*G01S 15/89* (2006.01)
*G01V 3/12* (2006.01)
*G01S 13/89* (2006.01)

(56) References Cited

U.S. PATENT DOCUMENTS

| | | | |
|---|---|---|---|
| 2002/0070342 A1 | 6/2002 | Berenz et al. | |
| 2003/0112170 A1* | 6/2003 | Doerksen et al. | 342/22 |
| 2003/0222809 A1 | 12/2003 | Nakazawa et al. | |
| 2004/0263624 A1* | 12/2004 | Nejikovsky et al. | 348/148 |
| 2007/0152803 A1* | 7/2007 | Huang et al. | 340/435 |
| 2007/0256499 A1* | 11/2007 | Pelecanos et al. | 73/579 |
| 2008/0079723 A1* | 4/2008 | Hanson et al. | 345/427 |
| 2008/0180322 A1 | 7/2008 | Islam et al. | |
| 2009/0140887 A1* | 6/2009 | Breed et al. | 340/990 |
| 2009/0282156 A1 | 11/2009 | Jung et al. | |
| 2010/0052971 A1* | 3/2010 | Amarillas | 342/22 |

OTHER PUBLICATIONS

Minnesota Department of Transportation, research project document, Jun. 2010.*
Red Dog Scientific Services, web page, specifications of SIR-20 by GSSI.*
Birken, et al., "Efficient Large-Scale Underground Utility Mapping Using a New Multi-Channel Ground-Penetrating Imaging Radar System," Geophysics 2002. The 2nd Annual Conference on the Application of Geophysical and NDT Methodologies to Transportation Facilities and Infrastructure, 13 pgs. (2002).
Busuioc, et al., "Novel, Low-Cost Millimeter-Wave System for Road Surface Characterization," Proceedings of the SPIE Smart Structures/NDE Conference, San Diego (Mar. 6-10, 2011) (9 pgs.).
Gorthi, et al., "Fringe Projection Techniques: Wither we are?," Optics and Lasers in Engineering, vol. 48, No. 2, pp. 133-140 (2010).
Hsu, et al., "A Practical Guide to Support Vector Classification," Available at www.csie.ntu.edu.tw/~cjlin/libsvm/, Initial Version: 2003, Last Updated: 2010 (16 pgs.).
Huang, N. E. and Shen, S. P., "Hilbert-Huang Transform and Its Applications," World Scientific Publishing Co. Pte. Ltd. (2005) (161 pgs.).
International Search Report and Written Opinion issued by the U.S. Patent and Trademark Office as International Searching Authority for International Application No. PCT/US2011/029189 mailed May 20, 2011 (11 pgs.).
Montgomery, D. C. and Runger, G. C., "Applied Statistics and Probability for Engineers," Third Edition, John Wiley & Sons, Inc. 976 pages (2003).
Noble, W.S., "What is a support vector machine," Nature Biotechnology, vol. 24, No. 12, pp. 1565-1567 (2006).
Peng, et al., "An Improved Hilbert-Huang Transform and its Application in Vibration Signal Analysis," Journal of Sound and Vibration, vol. 286, Issue 1-2, pp. 187-205 (2005).
Rajan, K., "Analysis of Pavement Condition Data Employing Principal Component Analysis and Sensor Fusion Techniques," MS Thesis, Kansas State University, 88 pages (2008).
Rohatgi, V. K. and Saleh, A. K. E., "An Introduction to Probability and Statistics," Second Edition, Wiley Series in Probability and Statistics (2001) (371 pgs.).
Slob, et al., "Surface and Borehole Ground-Penetrating-Radar Developments," Geophysics, vol. 75, No. 5; pp. 75A103-75A120 (Sep.-Oct. 2010).

* cited by examiner

ROAMING MOBILE SENSOR PLATFORM FOR COLLECTING GEO-REFERENCED DATA AND CREATING THEMATIC MAPS

CROSS REFERENCE TO RELATED APPLICATIONS

This application claims the priority of U.S. Provisional Application No. 61/315,571 filed Mar. 19, 2010, entitled, ROAMING MOBILE SENSOR PLATFORM COLLECTING GEO-REFERENCED SENSOR DATA AND CREATING THEMATIC MAPS, and of U.S. Provisional Application No. 61/434,559 filed Jan. 20, 2011, entitled TIRE EXCITED ACOUSTIC SENSING SYSTEM, Each of the aforementioned related applications is hereby incorporated by reference in its entirety.

STATEMENT REGARDING FEDERALLY SPONSORED RESEARCH

The research leading to this invention was carried out with U.S. Government support provided under a grant from the National Institute of Standards and Technology (NIST) Technology Innovation Program (TIP), Grant No. 70NANB9H9012. The U.S. Government has certain rights in the invention.

BACKGROUND

Civil infrastructure construction and maintenance represent a large societal investment. Despite being the lifeline of commerce, civil infrastructure has scarcely benefited from the latest advances in sensor technologies. Roadway work zones used for assessment and repair are a major source of traffic congestion, which results in lost productivity and wasted fuel.

Bridge deck and pavement deterioration frequently takes place below the surface and cannot be evaluated by visual means. Concrete deck deterioration includes delamination arising from chloride-induced rebar corrosion, cracking caused by alkali silica reaction (ASR), and cracking caused by overloading or excessive vibration. Pavement deteriorates due to internal moisture damage, debonding, and loss of subsurface support. Reinforced concrete (RC) or prestressed concrete (PC) bridge decks are often overlaid with an asphalt concrete or Portland cement concrete. The presence of the overlay makes it more difficult to detect the subsurface deterioration, and the overlay can also develop damage due to debonding. Pavement layers are subjected to extensive abrasion and deterioration from service loading (e.g., traffic) and environmental attacks (e.g., freeze-thaw, rain, road salts), and thus are subject to deterioration.

Common types of roadway damage are transverse cracks, longitudinal cracks, tracking, corrugation, potholes, delamination, and seepage. Transverse cracks occur more often than longitudinal cracks and can start with a fine crack of less than 0.5 mm in width and of less than 2 cm in depth. Such cracks are hardly visible when it is sunny, but are visible after rain due to the vaporization of the surface water that leaves water in the cracks. Small cracks need to be treated to prevent them from developing into larger cracks. Large cracks often have widths of more than 1 mm, depths of 5 cm, and run meters in length. If large cracks are not sealed, delamination and scaling will follow. If the adhesion between pavement and concrete deck decreases, the overlay may debond from deck's top surface. The loss of adhesion may be caused by seepage from cracks or potholes. Local debonding may span only several square centimeters and can be difficult to detect because the pavement surface remains intact. Large area delaminations may develop into large cracks at the pavement surface and eventually cause large potholes and loss of pavement. Feedback effects can complicate and accelerate damage progression. Cracks and potholes are often accompanied by seepage. Water enters into the overlay through cracks. The adhesion between asphalt and concrete deck is extremely vulnerable to water penetration. Water within cracks of a pavement will stay and seep. This is most harmful to asphalt pavement.

Traditional bridge deck inspection methods, such as chain drag, half-cell potentials, and chloride contents are slow, require closures, and are often not effective. Higher speed technologies such as ground penetrating radar (GPR), infrared thermography, and scanning impact-echo have been developed and used to some extent by highway agencies to meet their needs for bridge deck condition assessment. However, these technologies suffer from the need for traffic closures and insufficient spatial data coverage, which has reduced their acceptance and reliability. Thus, there remains a need for improved road and bridge deck inspection methods and devices using sensor technology.

SUMMARY OF THE INVENTION

The invention provides a roaming sensor system for the monitoring of civil infrastructure such as roads and bridge decks. One or more vehicles of a type that regularly travel on roads and highways are used to collect and integrate sensor measurements and to perform onboard assessments about subsurface integrity of roadways and bridge decks. The system permits the collection of spatial and temporal data whose coverage over time far exceeds that of vehicles that are sent out for the sole purpose of collecting data in a particular area. The system can be combined with the use of dedicated vehicles in specific areas to complement the data collected by the system. The roaming sensor system of the present invention provides accurate, up-to-date roadway and bridge deck condition information without setting up work zones or stopping traffic. It therefore eliminates the need for dangerous and expensive work zones. The roaming sensor system will also improve safety for the driving public and for inspection personnel. Collected and analyzed data can be made available to roadway and bridge deck decision makers in the public and private sector through a control center that manages data analysis and preparation of maps, charts, and other useful end products.

One aspect of the invention is a roaming sensor system for mapping a condition of a roadway. The system includes a vehicle, a positioning subsystem, a sensor subsystem, and a computer. The positioning subsystem collects geoposition data, and the sensor subsystem collects roadway condition data, as the vehicle travels on the roadway. The computer correlates the geoposition data and roadway condition data and produces a map of the condition on the roadway. In some embodiments, the system further includes one or more of a main controller that collects data onboard from the sensors and performs preliminary processing, a remotely located control center, a data transfer subsystem that transmits data to the control center, and one or more end products, such as a map, chart, or graph.

Another aspect of the invention is a method of mapping a condition of a roadway. The method includes the steps of providing a roaming sensor system as described above, driving the vehicle along the roadway while collecting geoposition data and data on the roadway condition, and correlating the geoposition data with the roadway condition data to produce a map of the condition on the roadway.

BRIEF DESCRIPTION OF THE DRAWINGS

FIG. 4 shows GPS data (black dots) obtained as the vehicle was driven around a test track. The data are superimposed on an aerial photograph of the test track area.

FIG. 14 shows a road surface profile obtained using an optical profiling system.

DETAILED DESCRIPTION OF THE INVENTION

The invention provides a roaming sensor system and method for early detection of poor bonding and delamination between roadway asphalt and concrete, as well as concrete debonding caused by corrosion of reinforcement. The system is simple and inexpensive, and permits detection of subsurface trouble spots at driving speeds without stopping traffic. The system also reports the subsurface condition in a quantitative manner using the opportunity afforded by ordinary vehicle traffic. Because data can be accumulated by the system through periodic assessment (e.g., daily or weekly), pattern recognition and classification can be used to eliminate false positive results.

Figure 1:
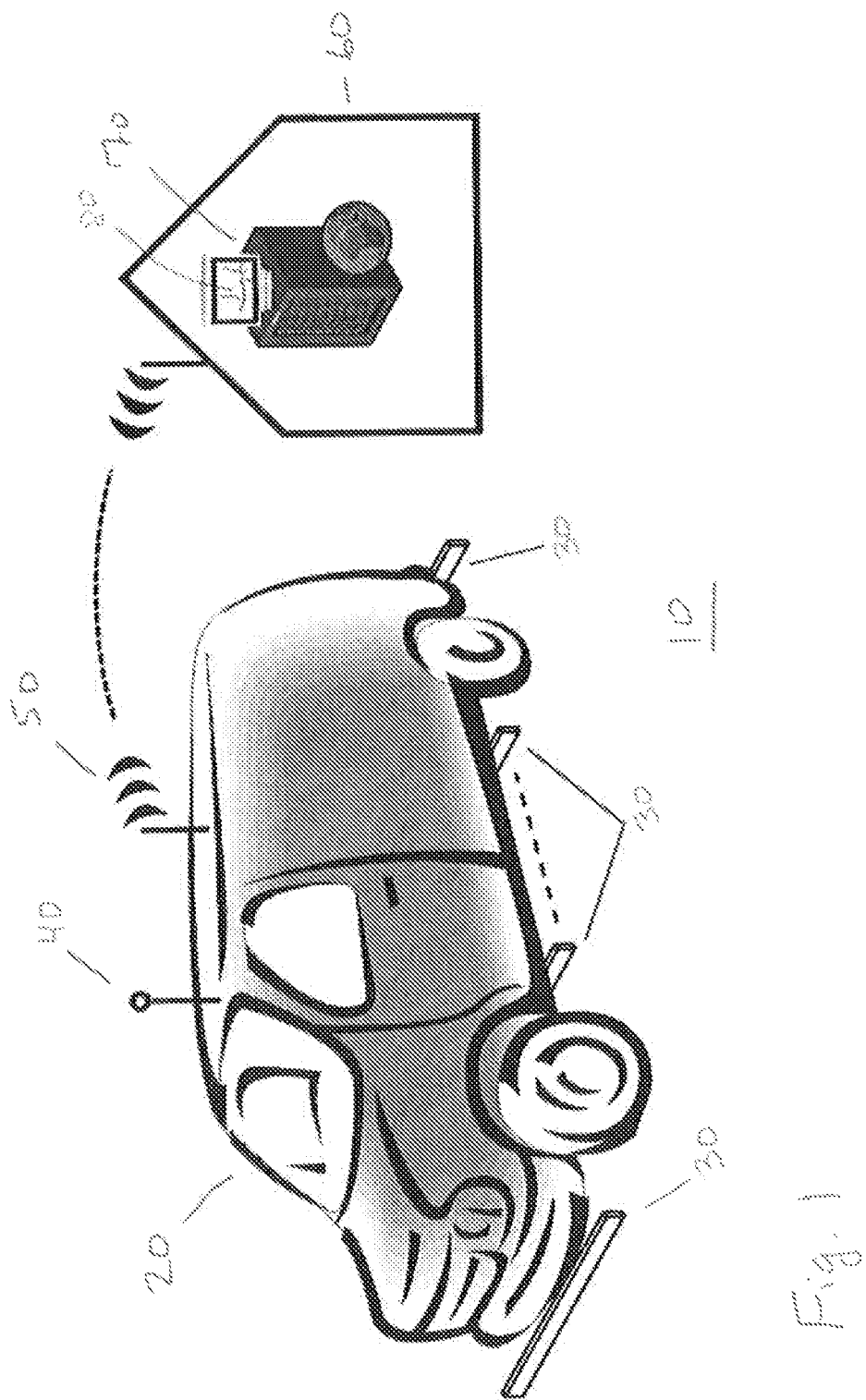
FIG. 1 shows an illustration of an embodiment of a roaming sensor system according to the invention.

The roaming sensor system includes a vehicle, a positioning subsystem, and a sensor subsystem. FIG. 1 shows an embodiment of a roaming sensor system 10. The system includes vehicle 20 with sensor subsystem 30 mounted on the vehicle so that its sensors can collect roadway condition data. Positioning subsystem 40, attached to or within the vehicle, collects geopositioning data, e.g., from GPS satellites, for the vehicle over time. Data transmission subsystem 50 transmits data from the positioning subsystem and the sensor subsystem, either in raw or processed form, to control center 60. The control center includes computer 70, which collects, stores, and analyzes the data, and produces output, such as map 80. In some embodiments, the system can further include a main controller, a data transfer subsystem, a control center, and/or one or more end products, such as a map, chart, or graph. Each of these components is explained in further detail below.

The vehicle can be a car (including a taxi), van, truck (including a delivery truck or shipping service vehicle), or other vehicle that drives, preferably at normal traffic speeds, around a certain geographic area. The vehicle is preferably an ordinary vehicle, such as a delivery van or truck, that has been modified by the addition of certain components to convert it into a roaming sensor system according to the invention. However, the vehicle can also be completely custom built and not comparable to an ordinary vehicle used for transportation, as long as it is capable of driving on public roads and bridges. The vehicle can be guided by a purpose unrelated to the sensor data collection and analysis (opportunistic vehicle), or it can drive a proscribed route determined by one or more data collection objectives. Use of a vehicle allows for the monitoring of large areas at shorter time intervals that with traditional road data collection. A vehicle according to the present invention, especially an opportunistic vehicle, can provide new data at time intervals on the order of days, weeks, or months, and thus can outperform other types of vehicle that are sent out to collect sensor data in only a particular limited geographic area, or at a particular time or time interval. By measuring the same roadway at certain repeat intervals, differences (e.g., worsening of individual road defects) over time can be detected and analyzed.

In a preferred embodiment of the invention, more than one vehicle is operated. For example, 2, 3, 5, or 10 or more vehicles can operate, either simultaneously or in tandem. The different vehicles can operate in different parts of a common geographical area. Their data can be pooled to create a map of the larger area in much less time than if a single vehicle were used. In an especially preferred embodiment, a fleet of vehicles is used. The fleet can be primarily dedicated to a purpose unrelated to collecting roadway condition data. For example, a fleet of delivery vans or trucks could be used by outfitting them with the appropriate sensors, geopositioning devices, control and data collection computers, and data transmission equipment. The fleet of vehicles can be driven on a route unrelated to roadway condition data collection, or it can, periodically for example, be diverted to collect roadway condition data. While a fleet of vehicles fully dedicated to roadway condition data collection also may be used, it is less cost effective than utilizing a fleet of opportunistic vehicles.

A roaming sensor system according to the invention is capable of uninterrupted data acquisition with the vehicle driven at up to ordinary traffic speeds, including at the posted or legal speed limit, or within 10 mph or 20 mph above or below the posted speed limit. Data acquisition can be carried out at rates that are limited by the capabilities of the sensor subsystems. Higher data acquisition rates will result in greater spatial resolution of end products such as maps and will increase their information content and utility for the end user. Using the sensor subsystems contemplated for the present invention, data acquisition rates are sufficient to allow continuous collection of data at speeds of at least 65 mph with high resolution. The possible resolution depends on the capabilities of each sensor subsystem. At 65 mph, resolution can be as high as about 50 frames/s for the optical subsystem using a 5 megapixel camera, as high as about 1,000 samples/s for the mm-wave radar subsystem (per channel, with a total of about 20 channels across the width of a lane of roadway on one vehicle), as high as about 40,000 samples/sec per each acoustic microphone or accelerometer channel for the acoustic subsystem (about 12 microphone and/or accelerometer channels per vehicle), and as high as about one GPR trace for every 1 to 5 cm of roadway length from each of about 16 GPR channels across the width of the vehicle for the GPR subsystem. The timing and interval of data acquisition by individual sensors or sensor domains can be controlled by the main controller, optionally in coordination with geoposition data. For example, data can be collected at regular time intervals or at regular distance intervals, according to a user defined program or operator commands. Especially when the vehicle is being driven for a purpose unrelated to data collection, it may be preferable to collect data at a specified distance interval rather than time interval, in order to maintain a desired spatial resolution under variable speed and direction of the vehicle. Using distance interval to regulate data collection also can help to compensate for varying traffic conditions.

The positioning subsystem can be any mobile system able to determine global positions or operate within a local coordinate system. The accuracy required of the positioning subsystem is determined by the final purpose of the data end product. Examples of suitable positioning subsystem components are: global positioning systems (GPS), differential GPS (DGPS), real-time kinematic-GPS (RTK-GPS), optical tracking systems, video positioning systems, and electromagnetic or acoustic positioning systems. Positioning subsystem components can be used in any combination, or can be complemented with inertial navigation systems including inertial navigation systems (INS) or distance measurement instruments (DMI) such as survey or trigger wheels, to form the positioning subsystem.

Figure 2:
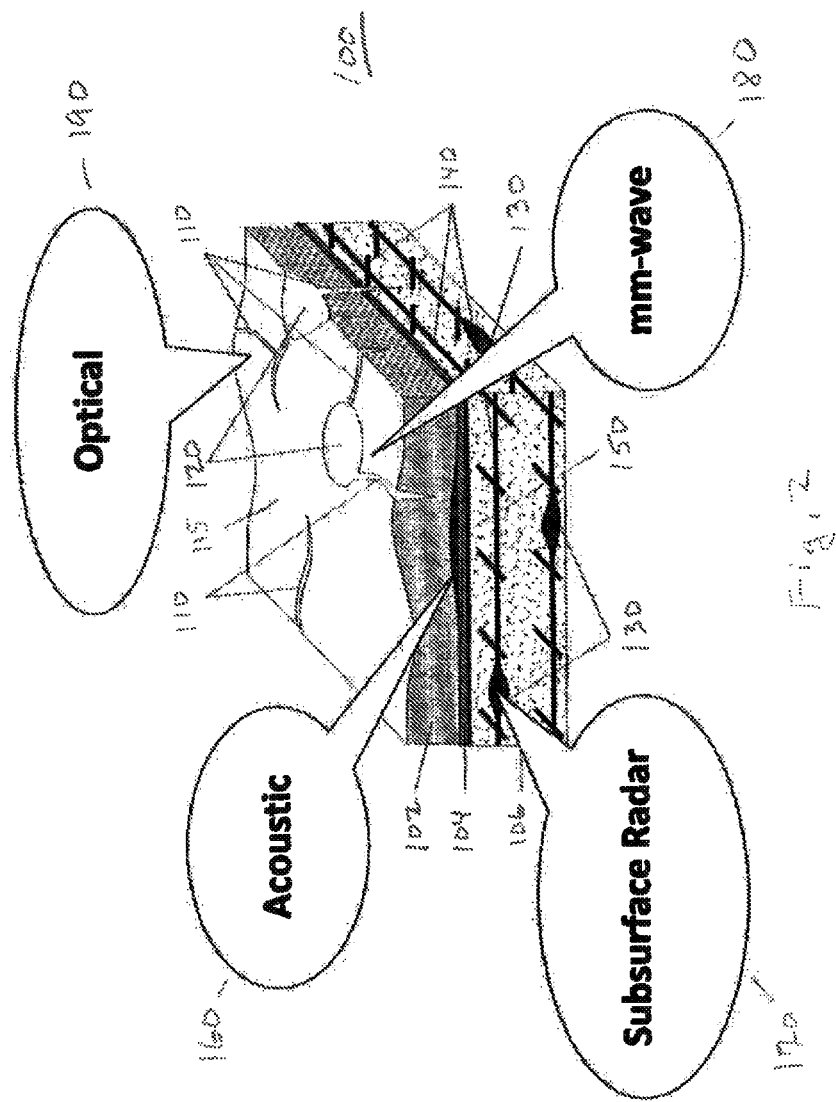
FIG. 2 is a drawing of a cross-section of a roadway showing a variety of defects and sensor types that can be used to detect them.

FIG. 2 illustrates several examples of the types of roadway damage that can be monitored with suitable sensors using a roaming sensor system of the present invention. The roadway 100 illustrated in FIG. 2 is a paved bridge deck. Pavement 102 contains cracks 110, tracking 115, and potholes 120, which can be monitored by optical subsystem 190 and/or surface radar subsystem 180. Sealing layer 104 is the locus of debonding 150, which is detected by acoustic sensor subsystem 160. Bridge deck layer 106 contains rebar 140 which is subject to corrosion and delamination 130 that is detectable by subsurface (i.e., ground penetrating) radar subsystem 170.

The sensor subsystem can be composed of a single sensor, multiple sensors of one kind, or multiple sensors of one type or different types. The sensor subsystem is the sum total of all road condition sensors associated with the vehicle. A sensor domain is defined as a group of sensors of the same type. The sensor subsystem can include one or more sensor domains, and each sensor domain can be subject to control, data collection, and/or initial data processing by a dedicated processor or computer. Sensors can measure a variety of properties of the roadway, roadway base, or roadway deck, including physical, biological, chemical, and geophysical properties. A "roadway" as used herein refers to any type of road for vehicular traffic, including the road surface, the subsurface structures and foundation of the road, and also includes a bridge or overpass deck structure. The sensor subsystem can be equipped with an electronic component that allows the data from each sensor to be stored and/or transferred to a computer, either within the mobile platform or at a remote location, for processing, visualization, interpretation, or other analytical purposes. Each sensor installed in the vehicle can include one or more microprocessors or computers (sensor computer) that can perform part or all of the desired data processing, visualization, and interpretation tasks to produce an end product. Preferably, the sensor computer performs only a portion of such processing. The sensor itself or the sensor computer transfers raw data, processed data, or interpreted data, in whole or in part, to another computer for further processing and/or analysis. In the case of collecting multiple sensor data sets it is preferred to use a computer (the "main controller") onboard the vehicle to interface with each of the sensors or groups of sensors and, optionally, to manage data transfer and analysis together with a remote computer in a control center. However, in some embodiments data can be transferred directly from the sensors or sensor computer to control center without first passing through a main controller. Certain functions including data storage, filtering, processing, synchronization and transmission can be accomplished by any of a sensor computer, a main controller, or a control center computer, as desired or as appropriate for the particular roaming sensor system design.

A data transfer subsystem manages data transfer from the vehicle to a control center and, optionally, command signals or programming from the control center to the vehicle. Through the data transfer subsystem, data can be transmitted from the sensor subsystem (i.e., from one or more sensors, groups of sensors, or from one or more sensor computers), or from a main controller in the vehicle to a computer in the control center. Transfer of data can be accomplished in any of a variety of ways, including by cellular network, other wireless network, wired network, or manually using one or more storage devices such as USB memory sticks, external hard disks, CDs, DVDs, and the like.

The sensor data can be subjected to data processing, visualization, and interpretation in a variety of ways. Although analysis of sensor data can take many forms, all sensor systems require that the sensor data be merged with the positioning data to allow for spatial analysis of the data and to create maps in local or global coordinate systems. Other analysis steps that can be performed include: filtering of the data, digital signal or image processing, gridding, krigging, performing other spatial or temporal interpolation algorithms, data reduction, pattern recognition, classification of road conditions and defects, and the like. The final outputs can be, for example, geo-referenced maps of various versions of the data (raw, processed, or interpreted). Such outputs can be presented using Geographic Information System (GIS) software, such as ARCGIS, Google Earth, Google Maps, and AutoCAD MAP, which is equipped to handle multiple maps and data layers (i.e., creation of a geospatial database). Initially, the individual sensor data can be processed in accordance with each type of data (e.g., acoustic, electromagnetic, optical, etc.). Subsequently, analysis can proceed by integrated processing, including joint processing of data from more than one sensor domain, visualization, and interpretation of the domain data or results. In a preferred embodiment, a GIS map of a roadway or roadway system is produced having two or more layers of information, data, or interpretation of data.

Figure 3:
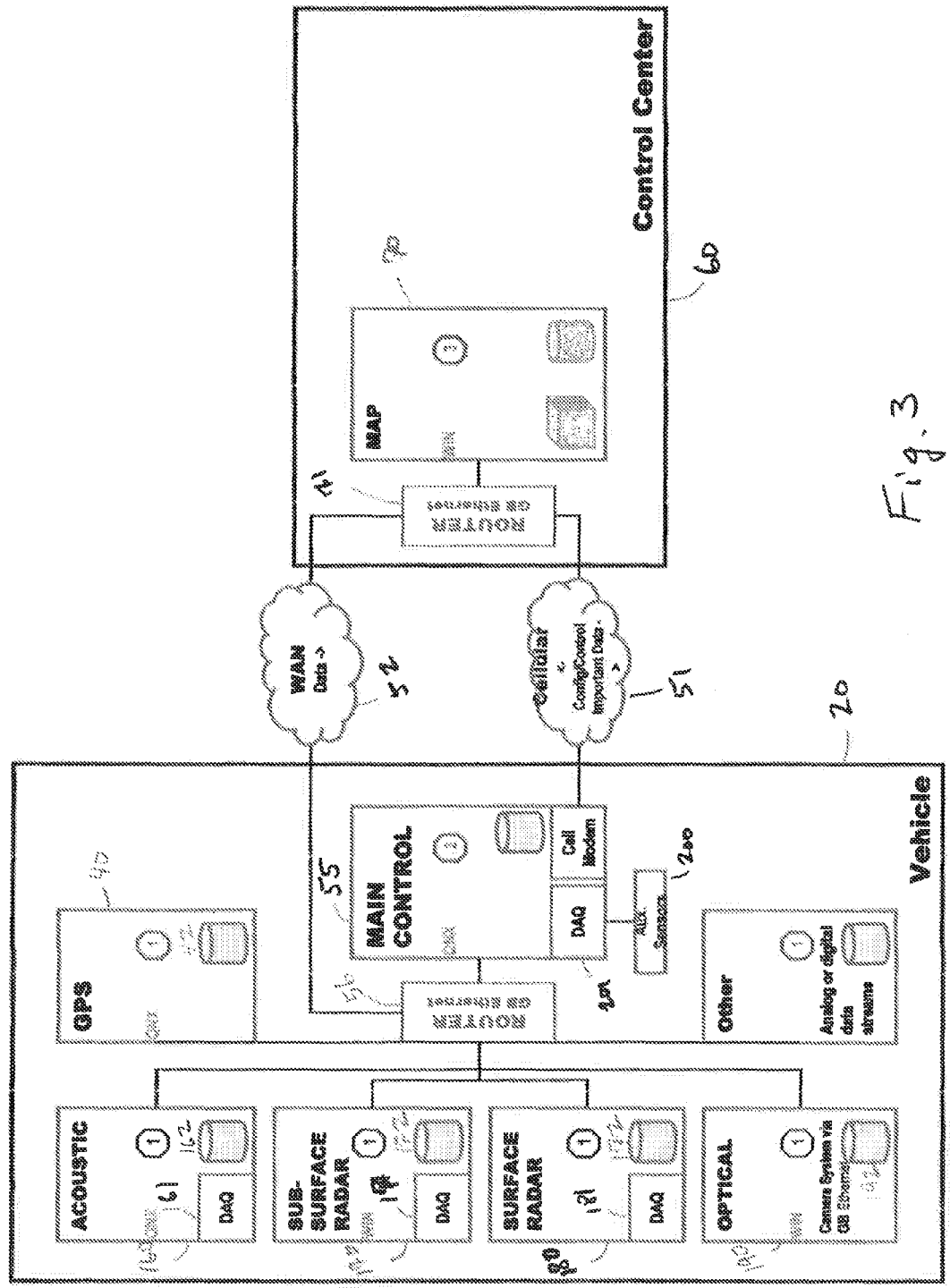
FIG. 3 shows an organizational chart of one embodiment of a roaming sensor system.
Figure 3:
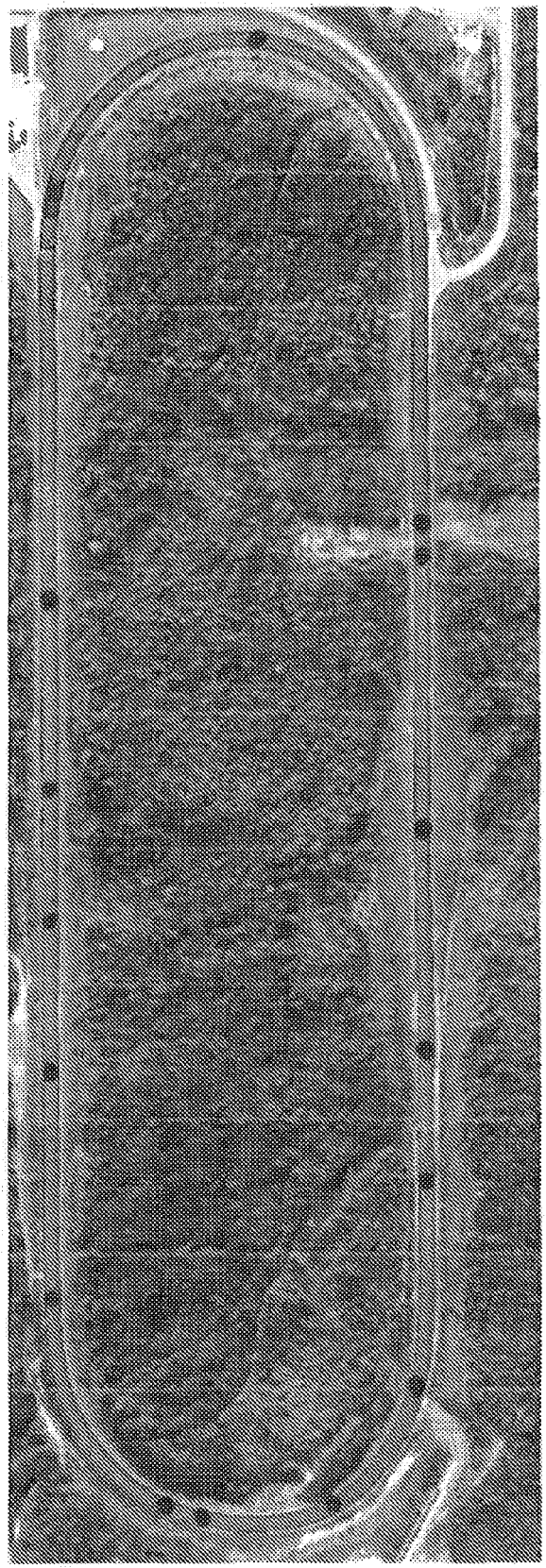

FIG. 3 depicts communication pathways among components of an embodiment of a roaming sensor system. Vehicle 20 contains several roadway sensor domains (160, 170, 180, 190), each of which can possess its own digital acquisition device (161, 171, 181) and its own microprocessor and/or memory device (162, 172, 182, 192). The sensor domains each communicate through Ethernet connections to router 56 located on the vehicle, which in turn communicates with main controller 55. Data from the sensors is sent from router 56 via wide area network (WAN) 52 to control center 60, where it is forwarded through router 71 to control center computer 70. Main controller communicates via cellular modem network 51 to control center router 71. The cellular data network is used to transmit commands from the control center to the main controller and to send important (e.g., time-sensitive) data to the control center. The WAN is used for the bulk of data transmission from the sensors to the control center. There are three levels indicated at which data processing can occur. The first level, indicated as the numeral "1" in a circle, is at the level of each sensor or sensor domain, the second ("2" in a circle) is at the level of the main controller, and the third ("3" in a circle) is at the control center computer.

The purpose of the roaming sensor system is to create a deliverable end product or set of end products (deliverables) that contain a spatial representation of the data (raw, processed, or interpreted) providing useful information to the end-user or client for a specific area of interest. The end product can be provided in any of several possible formats. These include digital, printed, and displayed forms of maps, engineering drawings, tables, GIS files, reports, statistics, and indices. Variations of the end product can be prepared according to their intended use, e.g., by researchers, administrators, decision makers, government personnel, regulatory agencies, public safety and security personnel, and the public.

In one embodiment, the roaming sensor system uses a small delivery van as the vehicle. The van is equipped with at least one positioning system and at least one sensor system. In a preferred embodiment, the vehicle is equipped with two or more different sensing technologies, such as a surface sensing technology and a subsurface sensing technology. In a more preferred embodiment, the vehicle is equipped with two different surface sensing technologies and two different subsurface sensing technologies in addition to a positioning system. For example, acoustic and electromagnetic sensor domains can be used to image the subsurface, while optical and electromagnetic sensor domains can be used to map the surface.

In addition to a positioning subsystem and a sensor subsystem, a preferred embodiment of the vehicle also includes a main controller that controls and manages the sensors and/or sensor domains as well as any auxiliary sensors, and further manages the data transfer subsystem used to transfer data to the control center for final analysis (see, e.g., FIG. 3). Auxiliary sensors measure parameters that can be used to correct other data. Auxiliary sensors can include, for example, one or more of a temperature sensor, a humidity sensor, a laser profilometer, and an accelerometer. In addition, the main controller can take on certain data processing and data reduction work, in particular for algorithms that require spatial positioning information or data from multiple sensor domains.

There are several options for capturing, processing, and transmitting data from the sensors. In one embodiment, each sensor domain is a stand-alone subsystem including a processor or computer that is connected to the control center. Data synchronization is accomplished by outfitting each sensor domain with its own positioning subsystem or via time synchronization to a stand-alone positioning system. In another embodiment, each sensor domain is a stand-alone system, with its own computer, but the sensor computer is not connected directly to the control center. Rather, it is connected to a main controller (i.e., another computer) onboard the vehicle; this main controller then controls the sensor domains, collects the positioning data, and is in charge of all communication to the control center. Synchronization of data streams can be accomplished through time stamping. In yet another embodiment, all sensors are directly connected to a main controller (i.e., without an intervening sensor computer), and the main controller is now also in charge of collecting the sensor data, in addition to the tasks mentioned above. All possible combinations of these embodiments are also contemplated by the invention. For example, some sensors or sensor subsystems could communicate directly with an off-vehicle control center, while others communicate with the main onboard controller, or some sensors could interface with a sensor computer while others interface directly with the main controller.

A variety of sensors can be employed in the roaming sensor system. Preferred sensor types include acoustic sensors, electromagnetic sensors (e.g., surface and ground penetrating radar), optical sensors, magnetometers, and electrical sensors. The sensor subsystem includes at least one acoustic, electromagnetic, or optical sensor type. An acoustic sensor is capable of detecting a surface acoustic wave. An electromagnetic sensor is capable of detecting a surface radar reflection or a subsurface radar reflection. An optical sensor records an optical image of a roadway surface. In a preferred embodiment, the sensor subsystem comprises at least two different sensor types, such as two or more of TEAS, GPR, SLMR, and an optical sensor (see below for definitions). In more preferred embodiments, the sensor subsystem comprises three, four, or more different sensor types, such as the combination of TEAS, GPR, SLMR, and an optical sensor.

An especially preferred sensor system is the Tire Excited Acoustic Sensor system (TEAS), which uses one or more of the tires of the vehicle to excite both surface acoustic signals and surface waves, which in turn produce additional acoustic signals. There are several advantages of the TEAS system. Vehicle tires are designed to be an acoustic source. Tire design, including geometry, materials, stiffness, mass, and the positioning of mass, can be adjusted to produce or optimize acoustic impulses so as to provide road surface information. Tires also may be modified so as to excite surface waves with preferred frequency content for a subsurface inspection. Traveling surface waves can be scattered by discontinuities in the roadway or bridge deck. The scattered surface waves can then be detected through their radiation in air from the road surface using a directional receiver array of microphones. Moreover, the vehicle tire also can be used as a source of force and a sensor of velocity for determining the input mechanical impedance of a roadway or bridge deck. Even where the scattering of surface waves is not detectable, mechanical impedance measurements can be a simpler yet effective alternative.

The TEAS system offers a number of advantages over previous methods. TEAS imparts the ability to sense bridge deck and pavement conditions at highway speeds. That is not possible using the traditional chain drag, impact-echo, and hammer-tap techniques, which require stopping traffic and inserting personnel into hazardous work zones. The use of tires as a mechanical excitation source eliminates the need for external excitation used by such traditional methods. The use of a non-contacting directional microphone array in the TEAS system allows the extraction of acoustic signatures most relevant to subsurface conditions. Furthermore, TEAS uses high speed signal processing to process signals and assess roadway conditions much faster than the chain drag method.

Another very useful sensor is surface looking millimeter wave radar. This surface sensor system helps to reduce hazardous driving conditions on roadways and bridge decks by indicating road surfaces that are coated with ice. After snow has been plowed off a road surface, ice occasionally remains or forms in patches, and identifying and treating these patches of hard to see "black ice" is important for maintaining safe driving conditions. Typically salting trucks dump considerable salt and sand throughout their routes to ensure there are no untreated patches of roadway. This can lead to excessive salt usage, since ice may only form in isolated patches. This system can also be deployed as a stand-alone sensor system, mounted on a salting truck, and it would sense areas of an otherwise wet or dry road that might be coated with a thin layer of ice. The device could then signal the salting system to specifically deposit the necessary amount of sand and salt to ensure melting, but avoid over-salting at these icy areas. This would reduce salt usage to only the small percentage of ice-coated pavement, saving money by using less salt and keeping trucks out longer between refilling salt. It would also help the environment by keeping unnecessary salt off the roads.

The main controller can utilize multiple alternative communication systems to transfer the sensor data to a remote control center for final analysis. The primary or preferred communication system is a cellular modem, which is mainly used for command and configuration messages between the main controller and the control center (see FIG. 3) and for the transmission of data that require real-time analysis (e.g. detection of black ice with the mm-wave radar). A cellular modem also can be used for other types of data transmission; however, the use of a cellular modem is often limited (e.g., 5 GB/month) without paying extra fees per vehicle. Preferably, the cellular modem is reserved for less data-intensive functions, since the system is capable of generating large amounts of data. The design of the roaming sensor system anticipates that only a portion of the data is transmitted to a remote control center. The system is capable of reducing the data onboard the vehicle, in the sensor subsystem and/or the main controller, prior to transmission.

Secondary communication systems can include either wired or wireless Ethernet, which can be used to upload to the control center some or all of the data that require further processing. This could be conveniently accomplished, for example, with the mobile platform parked in a suitable location with plug-in or wireless access to the control center. In another embodiment, data transfer is performed by manually swapping storage devices hard disks, external hard disks, flash memory, CDs, or DVDs.

The control center can be housed in a separate building, in one or more rooms, or one or more workstations within a room. The control center can in principle be limited to a single computer having the ability to communicate with the main controller and/or the sensor subsystem of the vehicle. The control center also can include two or more computers. Preferably, the control center includes one or more high resolution color monitors and/or color printers to produce end products and to allow an operator to control or program the system and to retrieve end products. The control center also can interface with one or more computer networks, including the internet, for communication of end products to clients. The control center can either be fully automated, or it can be operated by one or more human operators. The operators, or a program in the case of an automated or semi-automated control center, can issue instructions to one or more vehicles. Such instructions can be received by individual sensors or sensor domains, by the data transfer system, by the main controller, or by the driver of the vehicle or an assistant within the vehicle. The instructions can be used, for example, to alter the driving route, alter sensor operation (e.g., sensitivity settings, on/off settings, etc.), or to trigger or alter data analysis, storage, or transmission.

The control center software can be built on a geospatial database (e.g., Oracle) managed by a GIS system equipped to handle many maps or data layers. The control center is able to communicate with at least one, and preferably several (e.g., 2 or more, 3 or more, 5 or more, 10 or more, or 20 or more), individual vehicles of the roaming sensor system through their respective controllers. Preferably, the control center is also able to manage the vehicles with which it communicates. That is, the control center, either through a live operator or a program, can configure testing, monitoring, data transfer requests, and the like. The final level of data processing optionally can be handled by the control center, rather than by the main controller during data collection. A GIS-based system can generate maps of selected data layers containing raw sensor data, derived data, individual and joint interpretations, and can be complemented by existing or public domain data (e.g. aerial photography, street maps, street names, waterways, political boundaries, etc).

Another optional feature is to build additional data processing layers into the system. Initial sensor-dependent processing can take place within each subsystem. The main controller or a dedicated processing computer can then process the data spatially by applying the positioning information, and it can integrate information from multiple domains while processing.

The GIS-based control center can create custom output, such as spatial representations of the data (raw, processed, or interpreted), providing useful information to the end user or client for a specific area of interest. Output can be provided in printed and/or digital formats, and can be in the form of, for example, maps, engineering drawings, tables, GIS files, reports, and statistics. Final output can be custom formatted according to requests by end users in the public and private sector. Several delivery mechanisms can be utilized, including mailing of printed or digital maps in specified formats, downloading of requested maps in specified formats, and a web-based interface to access a GIS database with custom formatting and printing options. The GIS software preferably will be able to produce output data that are compatible with existing pavement and bridge deck management systems used by State Departments of Transportation and other authorities.

EXAMPLE 1

GPS Positioning System

A delivery van was outfitted with a positioning system consisting of two GPS positioning systems, one with centimeter resolution and the other with meter resolution, an inertial navigation systems (INS) with 6 degrees of freedom, and a distance measurement instrument (DMI) in the form of a wheel-mounted survey/trigger wheel. Positioning system data streams from those four instruments were recorded by either a dedicated computer or a main controller, both installed in the van. An additional component of the positioning system was an accurate time stamping signal provided by a GPS-based timing board, which was used to correlate each of the data streams with the others for processing. All of the positioning data streams were processed by a custom algorithm to output the most accurate position based on the available data.

FIG. 4 shows an output obtained from the system. The van was driven around the National Center for Asphalt Technology (NCAT) test track in Opelika, Ala. (see www.pavetrack.com). GPS data recorded with the van are plotted onto an aerial photograph of the track region, with the data points indicated as dots.

EXAMPLE 2

Acoustic Surface and Subsurface Sensing System

Figures 5A, 5B, 5C:
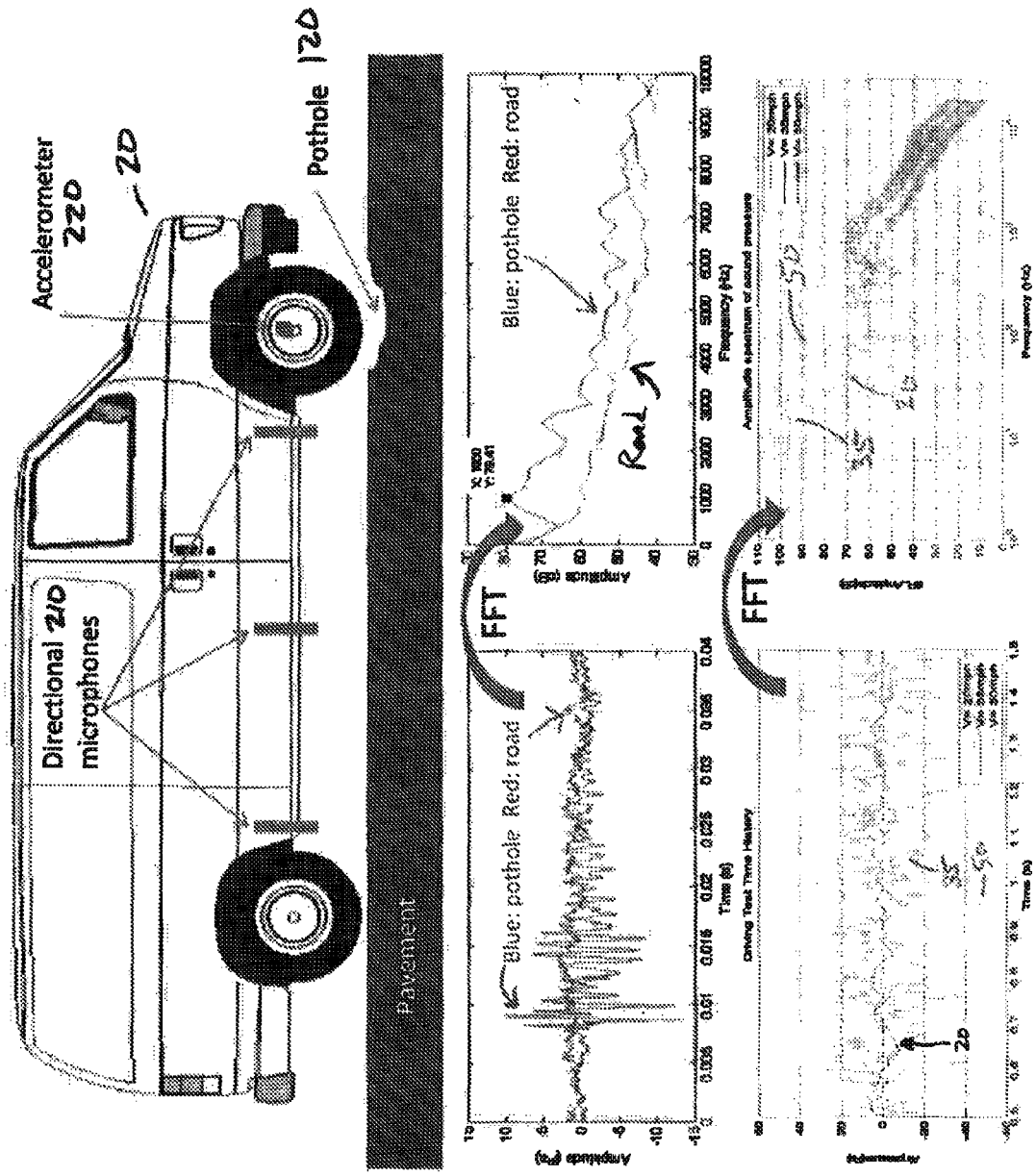
FIG. 5A shows a diagram of a vehicle outfitted with a tire excited acoustic system (TEAS).
FIG. 5B shows data obtained from the TEAS while driving over a pothole.
FIG. 5C shows TEAS data obtained from a normal road surface as a function of the vehicle speed.

A surface wave-based sensor was developed to monitor and interpret road and bridge deck acoustic responses at ordinary driving speeds. The system was termed the Tire Excited Acoustic Sensor system (TEAS). A schematic of the system is shown in FIG. 5A. The sensor system uses acoustic noise signals generated by tires 22 of the roaming sensor system vehicle 20 during normal driving to distinguish defects in asphalt overlay and concrete roadbed, focusing on the early detection of poor bonding between asphalt and concrete deck, and extensive cracking. The objective was to measure acoustic waves generated by the system vehicle's own tires during normal driving and to extract the condition of the asphalt pavement on the road and the condition of the concrete deck beneath it.

In this sensor system the tire is used as a mechanical source. Each tire transmits approximately one quarter of the vehicle weight to the road surface, which mechanically represents a large force traveling at the speed of a car. Corresponding friction forces between tire and road are also large. The TEAS approach leverages the complexity of responses generated at the tire-road interface to assess the condition of the road surface, while elastic surface waves generated in the road probe assess the subsurface condition.

In addition to exciting acoustic waves in air, the tires excite elastic waves in the ground. The TEAS system exploits the phenomenon to assess subsurface conditions. One of the dominant waves is the surface wave, which is an elastic wave with a concentration of energy near the ground surface. The wave travels parallel to the ground surface. Surface waves have been exploited in a variety of non-destructive evaluation (NDE) applications, such as mine detection, because the energy trapped near the surface only interrogates near the surface; it is naturally focusing. The surface wave radiates acoustic waves that can be detected by acoustic sensors, such as directional microphones. Excitation by automobile tires presents a more challenging scenario. Each set of tires excites surface waves in both directions. Nonetheless, an appropriately designed array of directional microphones placed under the vehicle is able to extract estimates of surface wave dispersion with sufficient accuracy so as to assess subsurface damage. The array of microphones was designed with attention to spacing and directivity in order to accurately sense the acoustic field radiated by the surface wave. In general, the spacing of the microphones should be chosen within the Nyquist sampling criteria of at least one microphone per half-wavelength. For directivity, the microphones should be oriented so as to be insensitive to the noise radiated directly by the car (including engine and exhaust noise), noise generated by wind, and noise radiated directly by the tire-road interface.

The measurements were performed using sampling microphones (FIG. 5A, reference numeral 210) and accelerometers (FIG. 5A, reference numeral 220) to record time series with frequency content of up to 20 kHz. Specifically, three G.R.A.S. 40AE directional microphones were mounted under the chassis along the side panel, spaced about 70 inches (178 cm) apart, pointing to the ground with 15 inches (38 cm) clearance. Two B&K (Bruel & Kjaer) 4507B004 accelerometers were installed at the front and rear axles. Sample time series data are shown in FIGS. 5B and 5C. FIG. 5B shows an acoustic signal produced by a pothole, and FIG. 5C shows road noise as a function of vehicle speed. A rapid quantitative analysis was performed using a fast Fourier transformation (FFT, results shown at right in FIGS. 5B, 5C).

Figure 6:
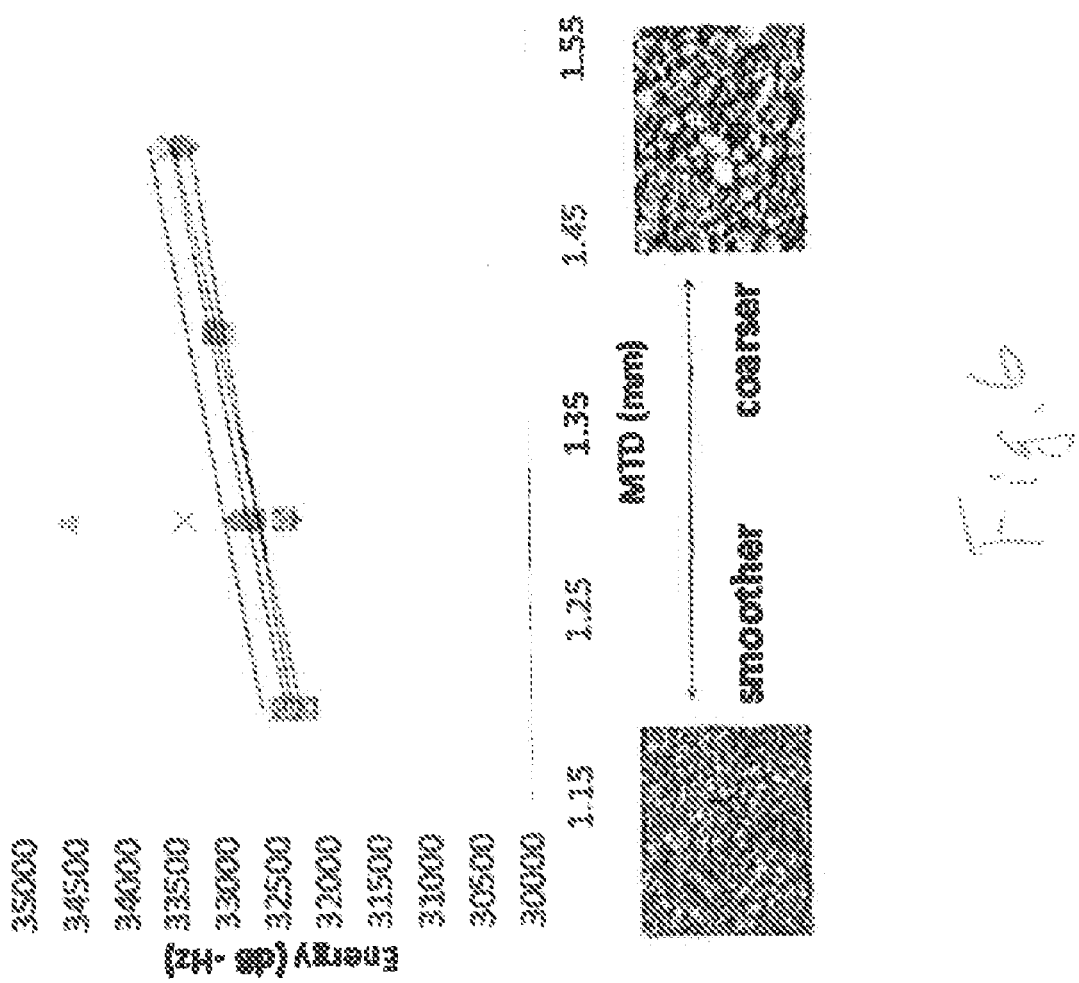
FIG. 6 shows the correlation obtained between TEAS data and mean surface texture depth (MTD) of a road surface.

Other quantitative analysis approaches also were used, including calculating the energy in a particular frequency band, which was then related to mean texture depth (MTD) as shown in FIG. 6 (results of several replicates shown). MTD is an index to describe the average depth of surface texture. It is measured with the Sand Patch Method (ASTM E965). The value is calculated as the volume of the standard sand bucket divided by the circular area when it is spread on the pavement surface.

Figure 7:
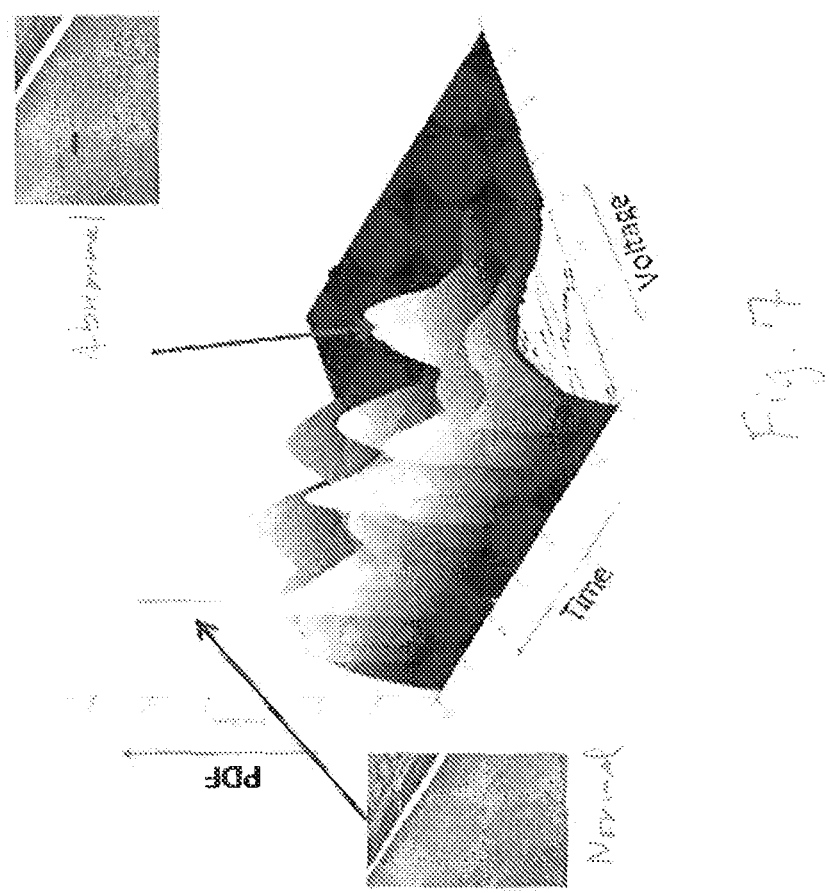
FIG. 7 shows the probability density function (PDF) of normal vs. abnormal road surface using TEAS data.

Yet another quantitative analysis method that was used is the calculation of probability density function (PDF), which shows features that can used to identify abnormal pavement for further evaluation (see FIG. 7). PDF is the recurrence probability density as a function of the investigated variable, which is voltage output of the air pressure from the microphone. The probability density is a statistics term that indicates how often a value recurs in comparison with all observed values. A description of the mathematic principle of PDF can be found in text books, including Rohatgi, V. K., "An Introduction to Probability and Statistics", Wiley-Interscience (2000); and Montgomery, Douglas. C. and Runger, George C., "Applied Statistics and Probability for Engineers", Wiley (2002). In FIG. 7, normal pavement showed a narrow peak of PDF at low voltage, whereas "abnormal" pavement (i.e., pavement containing any of a variety of defects) showed multiple peaks of PDF distributed at high voltage.

Still other analysis strategies that could be used with TEAS include classification algorithms such as a Support Vector Machine (SVM) and using a Hilbert-Huang Transform (HHT) to reveal changes in the road surface and to find indications of debonding. SVM is a machine learning technique for solving two-class pattern classification problems. It creates classifying criteria by training on data sets of given classes, and then classify new data with the criteria. More detailed background of SVM can be found in Noble, W. S., "What is a support vector machine", Nature Biotechnology 24(12), 1565-1567 (2006); and Hsu, C. W., Chang, C. C. and Lin, C. J., "A practical guide to support vector classification", available at www.csie.ntu.edu.tw/~cjlin/libsvm/ (2008). HHT is a mathematic transform which decomposes a time history into multiple modes in the time domain. By using HHT, subsurface wave propagation may be obtained in one mode without the interference of noise sources, which are separated to other modes. Theoretical background of HHT can be found in Huang, N. E and Shen, S. P. "Hilbert-Huang Transform and Its Application", World Scientific Publishing Co. Pte. Ltd (2005) and 2) Peng, Z. K., Tse, P. W.; and Chu, F. L., "An improved Hilbert-Huang transform and its application in vibration signal analysis", Journal of sound and vibration, Vol. 286, Issue. 1-2, p187-205 (2005).

EXAMPLE 3

Air-Coupled Ground Penetrating Radar (GPR) Array

Figure 8:
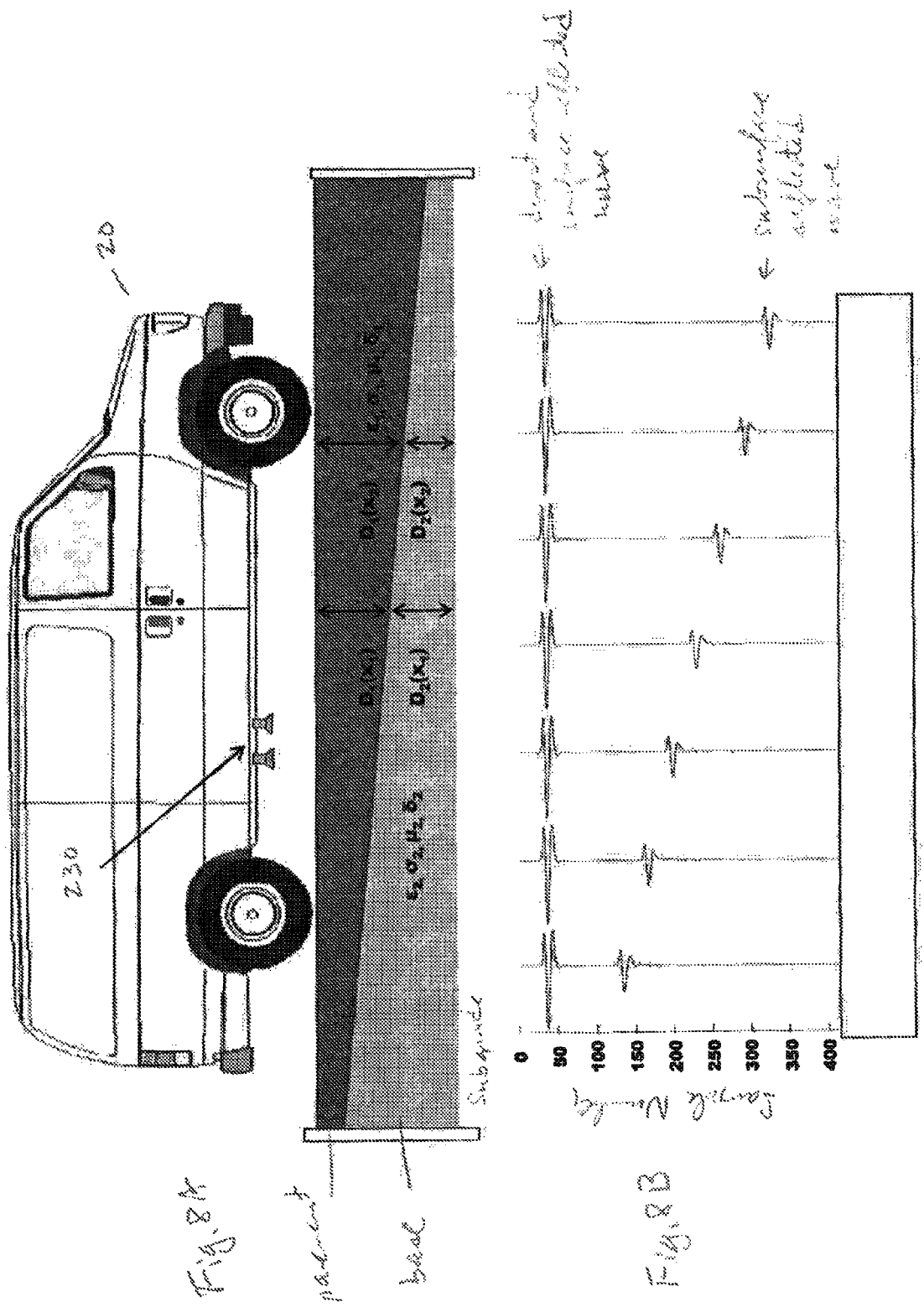
FIG. 8A shows a diagram of a vehicle outfitted with a ground penetrating radar (GPR) system.
FIG. 8B shows model radar reflections obtained from the GPR system when driving over a test surface with a depth gradient of subsurface base material.

A GPR array was designed to rapidly and automatically sense subsurface anomalies in roadways and bridge decks indicative of deterioration. Such anomalies would otherwise be invisible from a surface inspection of the road surface (FIG. 2). The fundamentals of GPR array technology to map the subsurface for many applications including utility mapping and roadway and bridge deck layer mapping and imaging is documented elsewhere (see, e.g., Slob, E., Sato, M., and Olhoeft, G., 2010, Surface and borehole ground-penetrating-radar developments: Geophysics, Vol. 75, p. 75A103-75A120; and Birken, R., Miller, D., Burns, M., Albats, P., Casadonte, R., Deming, R., DeRubeis, T., Hansen, T. and Oristaglio, M., 2002. Efficient large-scale underground utility mapping in New York City using a multi-channel ground-penetrating imaging radar system, Proc. SPIE, Vol. 4758, pp. 186-191). However, commercially available GPR array systems are not able to achieve the desired spatial coverage (order of centimeters) at normal traffic speeds. Therefore, a GPR array was constructed that is 16 to 30 times faster than any commercially available system to date and is able to collect the data at spatial densities required for imaging of the roadway and bridge deck subsurface. The speed increase was accomplished by taking advantage of faster analog to digital converters, such as a 12-Bit 250MS/s digitizer, that support 8 GHz equivalent time sampling. A schematic of a dual channel GPR system deployed on a vehicle is shown in FIG. 8A. The GPR antenna array 230 (transmitter-receiver pair) is mounted beneath the vehicle. The GPR sensing system is able to determine the layer thickness $D_i$ of the roadway and bridge deck layers and their electromagnetic properties $\in_i$, $\sigma_i$, and $\mu_i$, as indicated in FIG. 8B, and map subsurface moisture, corrosion, and subsurface defects such as voids. Each GPR time trace contains reflections or lack of reflections for each change in electromagnetic properties, which is an indirect measurement of moisture, corrosion, and subsurface defects such as voids by analyzing the collected GPR trace. The analysis of those traces alone or in groups reveals such properties as the pavement layer thickness' $D_i(x_j)$ of the i-th layer at any given position $x_j$ along the travelling path of the GPR channel, the dielectric constant $\in_i$, the conductivity $\sigma_i$, and the magnetic permeability $\mu_i$ of the i-th pavement layer at any given measurement location $x_j$.

EXAMPLE 4

Surface Looking Millimeter-Wave Radar

A 24 GHz radar system was used for an automatic quantitative pavement surface analysis that indicates pavement health. Details of the radar system can be found at Busuioc, D., Anstey, K, Rappaport, C., Birken, R., Doughty, J., and Wang, M., 2011, Novel, low-cost millimeter-wave system for road surface-characterization: Proceedings of the SPIE Smart Structures/NDE conference, San Diego, Mar. 6-10, 2011, in press. The data from the millimeter-wave radar sensor provided a surface profile and information on crack density and porosity. It also could detect surface cover, including ice, water, and oil.

Figure 9:
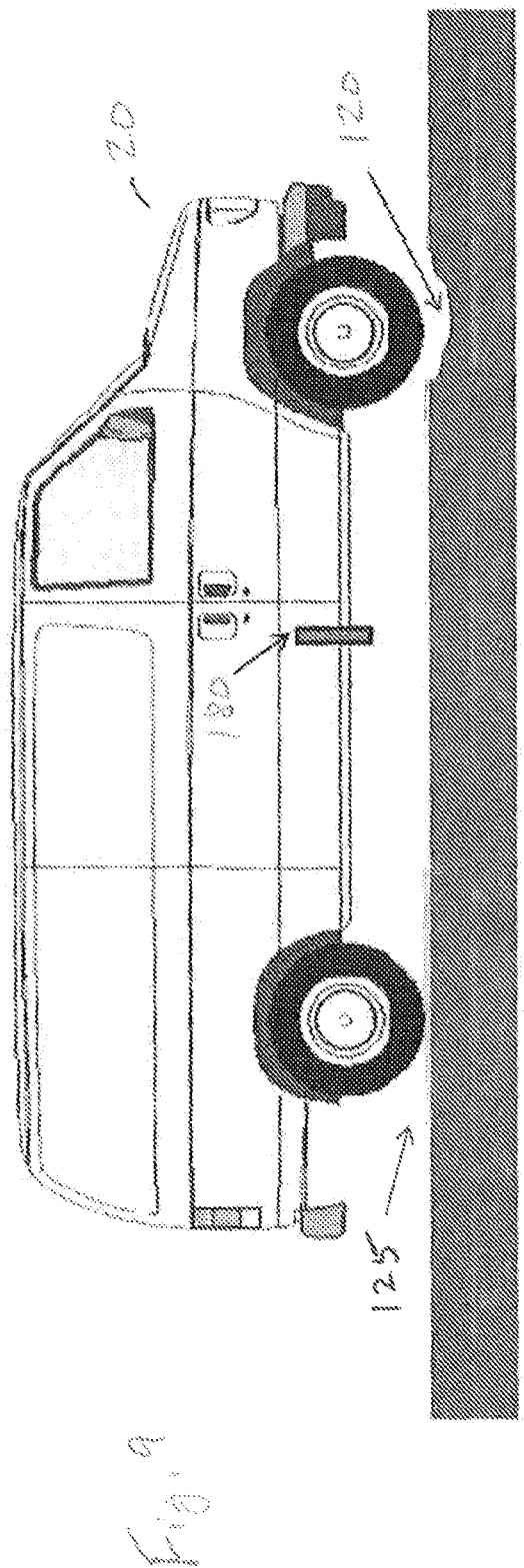
FIG. 9 shows a diagram of a vehicle outfitted with a mm-wave surface radar system.
Figure 10:
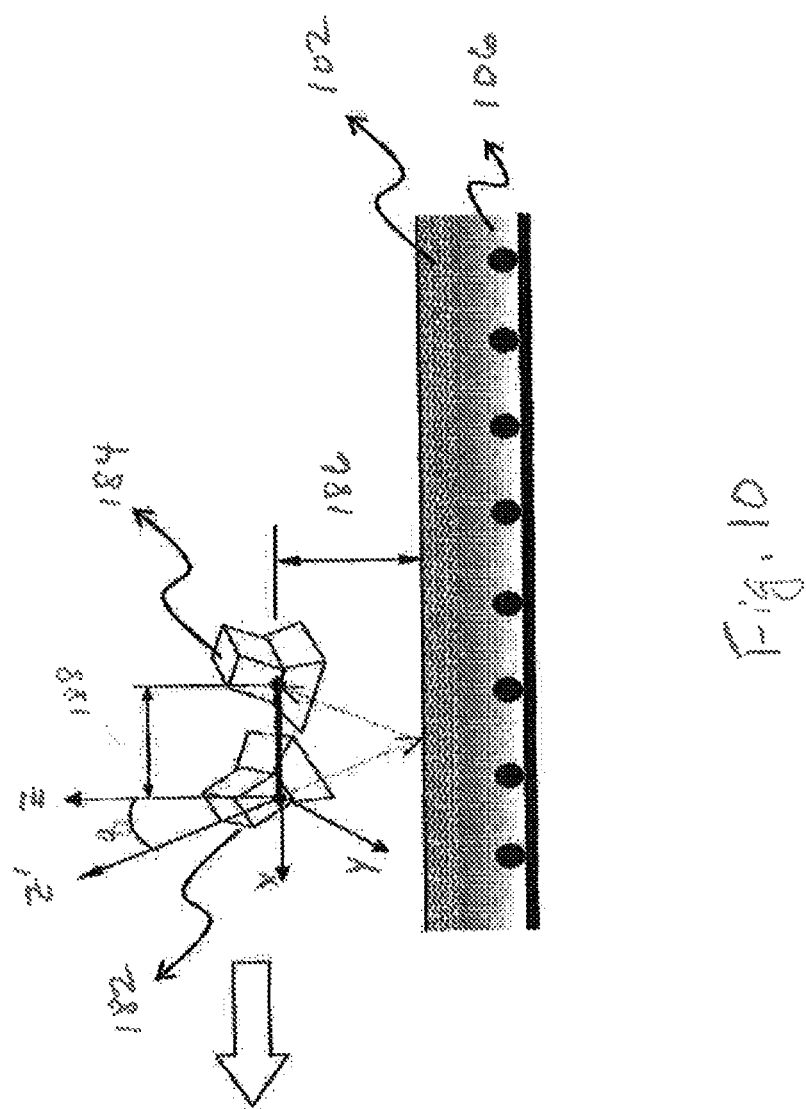
FIG. 10 shows a diagram of a mm-wave radar system configured to profile a road surface.

FIG. 9 shows a diagram of the millimeter-wave radar sensor system 180 mounted underneath the vehicle. The device could also be mounted beneath snowplows and sanding trucks. The device continuously transmits and receives radar pulses from the roadway surface. A diagram of the radar transmitting and receiving antennas and their relation to the roadway is shown in FIG. 10. The arrow indicates the direction of vehicle travel. The configuration of the transmitter 182 and receiver 184, including separation distance 188, are indicated. The distance 186 from the roadway surface is in the range from about 20 cm to about 40 cm and is adjustable. The distance between the antennas should be small and the received signal should be tuned for its installation distance and angle. This distance between antennas should be optimum for minimizing antenna to antenna coupling and can be between 1.25 and 15 cm. There can be a total of 1 antenna (where the antenna is used for both Transmit and Receive operations using a circulator or isolator type device) and 2×N antennas, where N antennas are used for the Transmitter and N antennas are used for the Receiver. Known algorithms can be used to configure how the N antennas are configured in order to obtain a suitable trade-off between coverage area and measurement accuracy.

Figure 11:
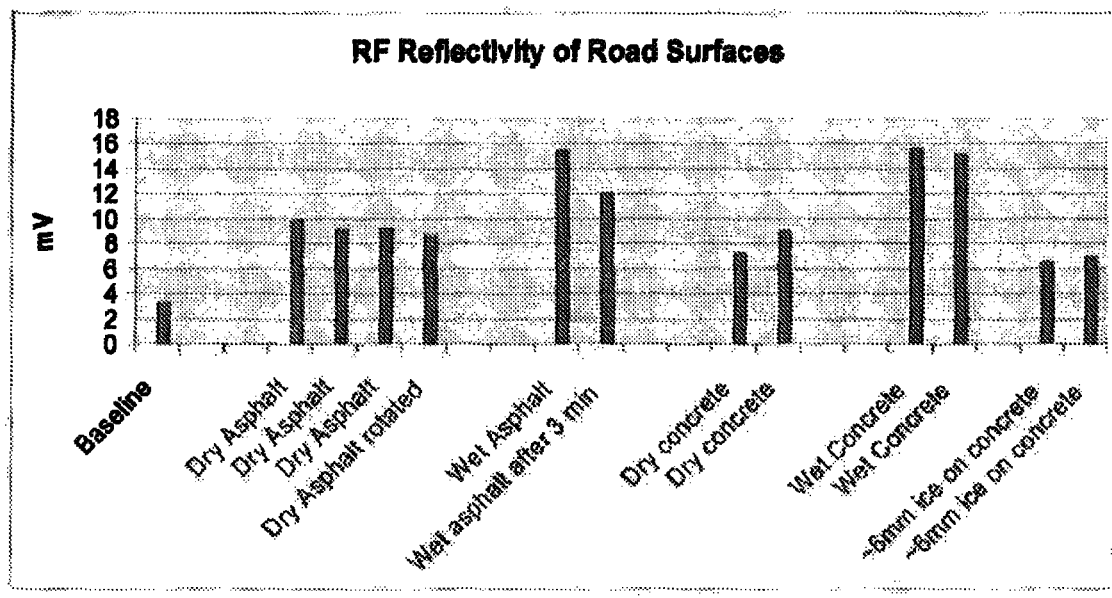
FIG. 11 shows the mm-wave radar reflectivity of a variety of road surfaces.

FIG. 11 shows the reflection responses obtained from various pavement test cases. Since ice has a lower dielectric constant than either dry pavement or wet pavement, the reflected signal intensity from ice is lower than from pavement. Dry asphalt and dry concrete yielded similar lower responses in the range of 7.2 to 9.2 on an unnormalized scale, while newly wetted asphalt and concrete have reflection responses in the range of 15.1 to 15.6, approximately 60% greater than the dry surfaces. When water was allowed to drain for three minutes, the reflection response reduced to 12.1, which is about 30% above the dry response. Since the radar works with very high frequency microwaves, 24 Ghz or higher, as little as two millimeters of ice will generate a measurable response, assuming that the resolution is a quarter wavelength in the media that the wave travels in.

EXAMPLE 5

Optical Sensing System

Figure 12:
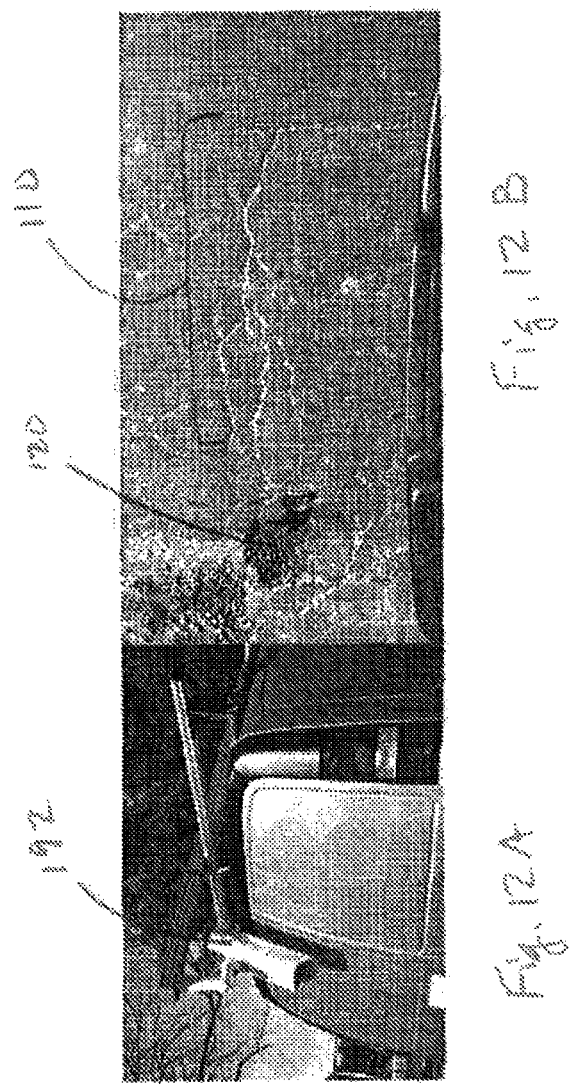
FIG. 12A shows the camera of an optical surface profiling system mounted on a vehicle.
FIG. 12B shows an image containing a pothole and a set of transverse cracks.

A video-based surface sensing system (FIG. 12A) was used to collect images of road and bridge deck surfaces. The system included video camera 192 mounted at the rear of the vehicle facing toward the road surface. A representative image is shown in FIG. 12B, showing pothole 120 and cracks 110. The video images can be analyzed using video and image analysis algorithms, which should allow semi-automatic identification, tracking, and classification of surface defects. See, e.g., Krithika, R., 2008, Analysis of pavement condition data employing Principal Component Analysis and sensor fusion techniques: MS thesis, Kansas State University.

Figure 13:
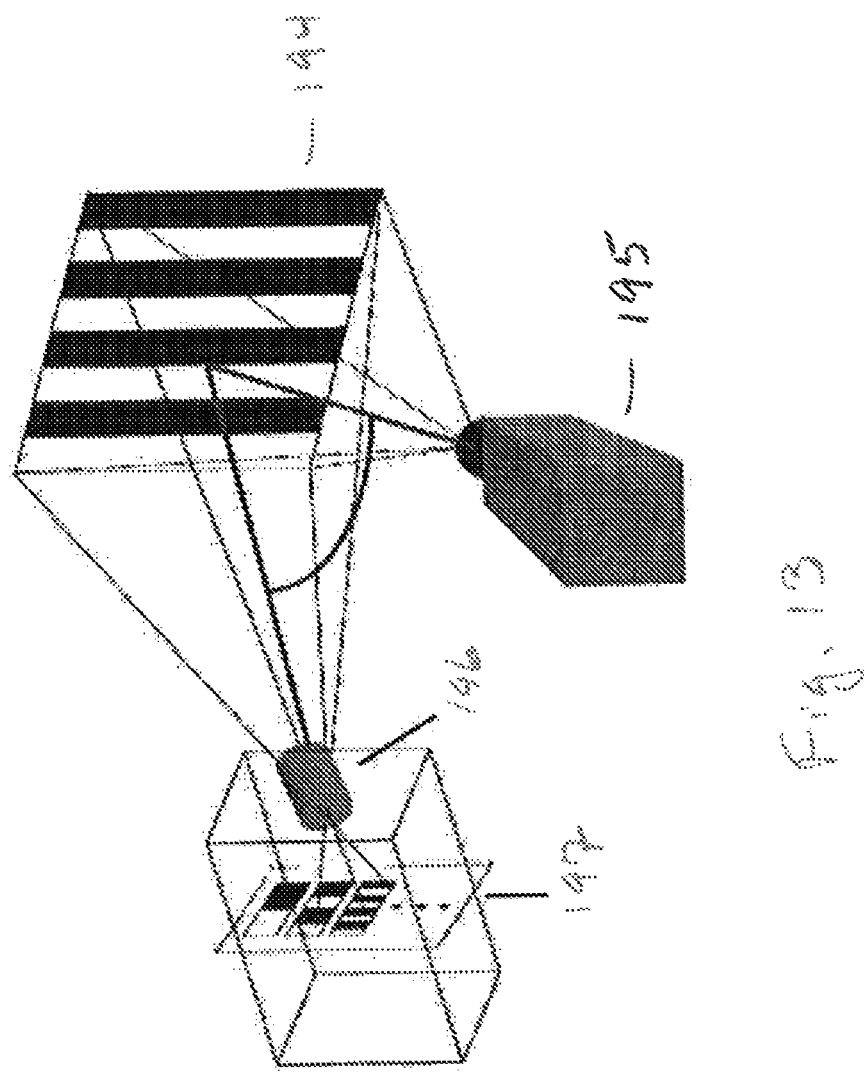
FIG. 13 shows a diagram of an optical road surface profiling system.
Figure 17:
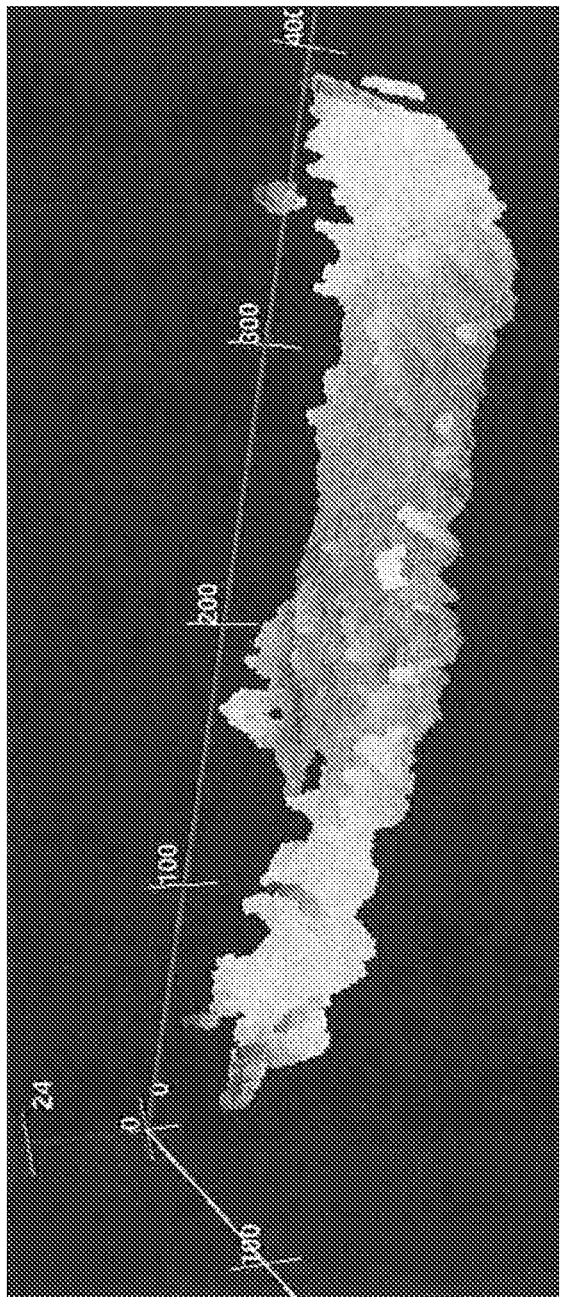

A second optical sensing technique that was used to collect data on road and bridge deck surface conditions is optical phase profilometry. The optical phase profilometry system uses digital pictures illuminated by periodic shadows to profile road surfaces (FIG. 13). Fringe pattern projector 195 projects a pattern of dark stripes onto road surface 194, and video camera 196 records digital image 197. This sensor system produces a surface elevation map of the roadway topography. For analysis of images containing fringe patterns, see, e.g., Gorthi, S. S., and Rastogi, P., 2010, Fringe Projection Techniques: Whither we are?: Optics and Lasers in Engineering, Vol 48, NO 2, pp 133-140. A representative surface is shown in FIG. 14. The resolution was approximately 2 mm, and the scale units in FIG. 14 are in mm.

A differential version of the profilometry system can be used to observe active cracking. In the differential version, two optical phase profilometry images of the same area are compared. In one image there is a significant surface load next to the crack (i.e., a tire is near the crack), while in the other image the load is missing (i.e., the image is taken between the tires or behind the vehicle). The images are obtained with the use of a fringe pattern projector in order to obtain a 3-D profile of the roadway surface both with and without load.

The invention claimed is:

1. A roaming sensor system for mapping roadway surface and subsurface conditions, the system comprising:
a positioning subsystem on a vehicle, wherein the positioning subsystem collects geoposition data of a vehicle as it travels on a roadway;
a tire excited acoustic sensor system (TEAS) comprising an array of directional microphones mounted under the vehicle for detecting acoustic waves excited by one or more tires of the vehicle moving over a roadway surface as the vehicle travels on the roadway; and
a computer that:
identifies, from the detected acoustic waves, first acoustic waves excited in the air from the tire-road interface, generates roadway surface condition data from the first identified acoustic waves, identifies, from the detected acoustic waves, second acoustic waves radiated from elastic surface waves excited along the roadway surface from the tire-road interface, generates roadway subsurface condition data from the second identified acoustic waves, and correlates the geoposition data with the roadway surface condition data and the roadway subsurface condition data and produces a map of the roadway surface and subsurface conditions.

2. The system of claim 1, wherein the TEAS detects said acoustic waves at an ordinary driving speed for the roadway and the roaming sensor system accurately determines roadway surface and subsurface conditions from data gathered at the ordinary driving speed.

3. The system of claim 2, wherein the roaming sensor system accurately determines roadway surface and subsurface conditions from data gathered at a speed of at least 65 mph.

4. The system of claim 1, wherein the computer is remotely located from the vehicle.

5. The system of claim 4, further comprising a data transmission subsystem that wirelessly transmits the geoposition data, the roadway surface condition data and the roadway subsurface condition data in at least one of raw and processed form to the computer.

6. The system of claim 1, further comprising a main controller that accepts data from the TEAS and transmits the data in at least one of raw and processed form to the computer.

7. The system of claim 5, further comprising a main controller that accepts data from the TEAS and transmits the data in at least the one of raw and processed form to the data transmission subsystem.

8. The system of claim 6, wherein the main controller further accepts geoposition data from the positioning subsystem and correlates the geoposition data with the roadway surface condition data and the roadway subsurface condition data before transmitting the road surface and subsurface condition data.

9. The system of claim 1, further comprising a sensor subsystem collecting additional roadway condition data as the vehicle travels on the roadway.

10. The system of claim 9, wherein the sensor subsystem comprises one or more sensors selected from the group consisting of acoustic sensors, electromagnetic sensors, and optical sensors; and wherein the sensor subsystem detects a surface acoustic wave, a surface radar reflection, a subsurface radar reflection, an optical image, or a combination thereof.

11. The system of claim 9, wherein the sensor subsystem comprises an air coupled ground penetrating radar (GPR) system.

12. The system of claim 11, wherein the GPR system collects at least 16 channels of data across a width of the roadway.

13. The system of claim 12, wherein the GPR system collects data with a spatial resolution in a range of 1-5 cm along a length of the roadway while the vehicle is driven at a speed of at least 65 mph.

14. The system of claim 9, wherein the sensor subsystem comprises a surface looking millimeter wave radar (SLMR) system.

15. The system of claim 9, wherein the sensor subsystem comprises a video-based surface sensing system, an optical profilometry system, or a differential optical profilometry system.

16. The system of claim 15, wherein the sensor subsystem produces a topography map of the roadway surface with at least 2 mm resolution.

17. The system of claim 1, further comprising one or more auxiliary sensors selected from the group consisting of a temperature sensor, a humidity sensor, a laser profilometer, and an accelerometer.

18. The system of claim 1, wherein the roaming sensor system comprises at least two different types of sensors.

19. The system of claim 18, comprising at least two sensor types selected from the group consisting of the TEAS, a GPR, an SLMR, and an optical sensor.

20. The system of claim 19, comprising the TEAS, a GPR, an SLMR, and an optical sensor.

21. The system of claim 1, comprising a plurality of said vehicles, each vehicle comprising a said positioning subsystem and a said TEAS, wherein data from each of the positioning subsystems and the TEAS are transmitted to one or more computers at a single control center.

22. The system of claim 20, comprising at least ten said vehicles.

23. The system of claim 1 that produces a GIS map of roadway surface and subsurface conditions having two or more layers.

24. The system of claim 1, wherein the system is capable of identifying roadway damage selected from the group consisting of cracks, potholes, debonding, tracking, delamination, and rebar corrosion.

25. A method of mapping a condition of a roadway, the method comprising the steps of:

providing a roaming sensor system according to claim 1;

while the vehicle travels along the roadway, collecting geoposition data and acoustic data from the acoustic waves generated from the excitation of the tires by the roadway;

generating roadway surface and subsurface condition data from the collected acoustic data; and correlating the geoposition data with the roadway surface and subsurface condition data to produce a map of the roadway surface and subsurface conditions.

26. The method of claim 25, wherein the vehicle travels at an ordinary driving speed for the roadway while geoposition and acoustic data are collected.

27. The method of claim 25, wherein the system comprises a data transfer subsystem and the geoposition data, the acoustic data, and the roadway surface and subsurface condition data in at least one of raw and processed form are transmitted by the data transfer subsystem to the computer at a location remote from the vehicle.

28. The method of claim 27, wherein the data are transmitted wirelessly.

29. The method of claim 27, wherein the data are transmitted by cable.

30. The method of claim 27, wherein the data are transmitted on a storage medium.

31. The method of claim 25, wherein the system comprises a main controller that collects the roadway surface and subsurface condition data and then transmits the processed data to the computer at a location remote from the vehicle.

32. The method of claim 31, wherein the main controller processes the data prior to transmitting the data to the computer at a remote location.

33. The method of claim 25, wherein the roadway surface and subsurface condition data are obtained by at least two sensor systems selected from the group consisting of TEAS, GPR, SLMR, and an optical sensor system.

34. The method of claim 33, wherein the roadway surface and subsurface condition data are obtained by the TEAS, a GPR, an SLMR, and an optical sensor system.

35. The method of claim 25, wherein the roadway surface and subsurface condition data are processed by an algorithm that converts the roadway surface and subsurface condition data into a signal or an image indicative of roadway damage.

36. The method of claim 35, wherein the damage is selected from the group consisting of cracks, potholes, debonding, tracking, delamination, and rebar corrosion.

37. The method of claim 25, further comprising the step of analyzing the correlated data to add interpretive information to the map of the roadway surface and subsurface conditions.

38. The method of claim 25, further comprising the step of collecting data from one or more auxiliary sensors and modifying the roadway surface and subsurface condition data using the auxiliary sensor data.

39. The method of claim 25, wherein a plurality of vehicles are driven over roadways in different regions of a geographical area, and the roadway surface and subsurface condition maps from individual vehicles are combined to produce a roadway surface and subsurface condition map of the geographical area.

40. The method of claim 39, wherein 10 or more vehicles are used.

41. The method of claim 25 which is repeated after a selected time interval and the roadway condition data are analyzed for changes in roadway damage.

42. The method of claim 25, wherein the vehicle is driven along a route selected for a purpose other than collecting roadway surface and subsurface condition data.

43. The method of claim 25, wherein the vehicle is driven along a route selected for a purpose of collecting roadway surface and subsurface condition data.

44. The method of claim 25, wherein the roadway is a bridge deck.

45. The method of claim 25, wherein the roadway is a surface road.

46. The method of claim 25, wherein an operator or a program transmits an instruction from a remote location to the vehicle, and the route of the vehicle or a mode of sensor operation, data collection, or data processing is altered in response to the instruction.

47. A roaming sensor system for mapping roadway damage, the system comprising:
a control system comprising:
a receiver for receiving geoposition data from a positioning subsystem and roadway surface and subsurface condition data generated from acoustic data collected from a tire excited acoustic sensor system (TEAS) comprising an array of directional microphones mounted under the vehicle for detecting acoustic waves excited by one or more tires of a vehicle moving over a roadway surface as the vehicle travels on the roadway; and
a computer that correlates the geoposition data and roadway surface and subsurface condition data and produces a map of the roadway surface and subsurface conditions.

48. The system of claim 1, wherein the surface condition data includes an estimated mean texture depth (MTD) index for portions of the roadway surface.

* * * * *